US011907982B2

(12) United States Patent
Phillips et al.

(10) Patent No.: US 11,907,982 B2
(45) Date of Patent: Feb. 20, 2024

(54) SYSTEMS AND METHODS FOR AUTHENTICATED DELIVERY BY UNMANNED VEHICLE (UV)

(71) Applicant: CAPITAL ONE SERVICES, LLC, McLean, VA (US)

(72) Inventors: Jeremy J. Phillips, Brooklyn, NY (US); Kevin S. Park, Little Neck, NY (US); Shane F. Blackman, New York, NY (US)

(73) Assignee: Capital One Services, LLC, McLean, VA (US)

( * ) Notice: Subject to any disclaimer, the term of this patent is extended or adjusted under 35 U.S.C. 154(b) by 37 days.

(21) Appl. No.: 17/457,945

(22) Filed: Dec. 7, 2021

(65) Prior Publication Data

US 2022/0092657 A1    Mar. 24, 2022

Related U.S. Application Data

(63) Continuation of application No. 15/886,752, filed on Feb. 1, 2018, now Pat. No. 11,227,318.

(51) Int. Cl.
*G06Q 30/0601*     (2023.01)
*G06Q 10/0832*     (2023.01)
(Continued)

(52) U.S. Cl.
CPC ....... *G06Q 30/0609* (2013.01); *B64C 39/024* (2013.01); *G06Q 10/0832* (2013.01); *B64U 2101/60* (2023.01); *B64U 2201/10* (2023.01)

(58) Field of Classification Search
CPC ................. G06Q 10/0832; G06Q 30/0609
(Continued)

(56) References Cited

U.S. PATENT DOCUMENTS 9,189,788 B1   11/2015   Robinson et al.
9,359,074 B2    6/2016   Ganesh et al.
(Continued)

FOREIGN PATENT DOCUMENTS

WO    WO-2018111618 A1 *   6/2018   ............ G01C 21/34

OTHER PUBLICATIONS

Altawy, Riham, and Amr M. Youssef. "Security, privacy, and safety aspects of civilian drones: A survey." Nov. 2016. ACM Transactions on Cyber-Physical Systems 1.2. pp. 1-25. https://dl.acm.org/doi/pdf/10.1145/3001836. (Year: 2016).*

(Continued)

*Primary Examiner* — Jeff Zimmerman
*Assistant Examiner* — Hunter A Molnar
(74) *Attorney, Agent, or Firm* — Perkins Coie LLP

(57) ABSTRACT

Systems and methods are provided for coordinating an Unmanned Vehicle (UV) to perform authenticated delivery of goods. A method for coordinating a delivery may include instructing, via a communication network, a user device to collect user preferences on delivery logistics. The method may also include receiving the user preferences from the user device. The method may also include receiving user financial data from a financial service provider server. The method may also include receiving real-time information comprising location information of a UV and a user device. The method may also include authorizing the delivery of the package if an authentication process is satisfied based on the user preferences, the user financial data, and the real-time information. The method may also include transmitting to the UV a command to complete the delivery, if the delivery is authorized. The method may also include transmitting to the UV an abort command, if the delivery is not authorized.

20 Claims, 6 Drawing Sheets

(51) Int. Cl.
   *B64C 39/02* (2023.01)
   *B64U 101/60* (2023.01)
(58) Field of Classification Search
   USPC .......................................................... 705/332
   See application file for complete search history.

(56) References Cited

U.S. PATENT DOCUMENTS

| | | | |
|---|---|---|---|
| 9,406,067 | B1 | 8/2016 | Robinson et al. |
| 9,459,620 | B1* | 10/2016 | Schaffalitzky ......... B64D 31/06 |
| 11,232,394 | B1* | 1/2022 | Pinette .................. H04L 67/306 |
| 2006/0074768 | A1 | 4/2006 | Horton |
| 2010/0325698 | A1 | 12/2010 | Ginter et al. |
| 2011/0016054 | A1 | 1/2011 | Dixon et al. |
| 2012/0030133 | A1 | 2/2012 | Rademaker |
| 2012/0089531 | A1 | 4/2012 | Klingenberg et al. |
| 2015/0081587 | A1 | 3/2015 | Gillen |
| 2016/0033966 | A1 | 2/2016 | Farris et al. |
| 2016/0068264 | A1* | 3/2016 | Ganesh .................. B64C 39/024 701/4 |
| 2017/0050747 | A1 | 2/2017 | Wessler et al. |
| 2017/0090484 | A1 | 3/2017 | Obaidi |
| 2017/0118025 | A1* | 4/2017 | Shastri .................. H04L 9/3231 |
| 2017/0124789 | A1 | 5/2017 | Rephlo |
| 2019/0077506 | A1* | 3/2019 | Shaw ...................... G06F 21/00 |

OTHER PUBLICATIONS

Altawy, Rihan, and Amr M. Youssef. "Security, privacy, and safety aspects of civilian drones: A survey." ACM Transactions on Cyber-Physical Systems 1.2 (2016): 1-25. https://dl.acm.org/doi/pdf/10.1445/3001836 (Year: 2016).

* cited by examiner

SYSTEMS AND METHODS FOR AUTHENTICATED DELIVERY BY UNMANNED VEHICLE (UV)

CROSS REFERENCE TO RELATED APPLICATIONS

This application is a continuation of application Ser. No. 15/886,752, filed Feb. 1, 2018, now allowed. The above-cited Application is incorporated herein by reference in its entirety.

TECHNICAL FILED

The present disclosure provides systems and methods for coordinating an Unmanned Vehicle (UV) to perform authenticated delivery of goods. In particular, in some embodiments, the delivered goods may be financial goods such as money, checks, or documents.

BACKGROUND

Unmanned Vehicles (UVs) are rapidly being adopted in many industries. Among various applications of UV, delivering goods and products is the most well-known and apparent. Many companies are exploring the potential of UV delivery, especially to solve the problem of "last mile" deliveries. For example, a well-known pizza chain company successfully completed the first commercial pizza delivery by a drone in 2016. Another retail company flew a package of books and sunscreen to a destination.

As UV delivery expands its scope to broader category of goods, for example financial goods, security concerns grow as well because UVs, such as drones in the air, may draw attention from the public and increase vulnerability to theft or data compromise. Consumers desire instant, on-demand access to financial goods, such as money, banking services, and important financial documents. For convenience and security reasons, consumers may prefer to have those financial goods delivered to them directly, instead of visiting an ATM or waiting for delivery by courier or mail. For example, consumers may prefer to have a package delivered directly from a bank to them rather than relying on postal courier or delivery services, which could be more susceptible to human errors. Also, for the security, consumers may be required to be present at the delivery location to receive and confirm the delivery. However, consumers may also desire flexibility to let the package be delivered while they are not present at the destination.

For example, some vendors may demand cash payment from a consumer, but a consumer may not have any cash on hand. A consumer may then have to search for an automated teller machine (ATM) near their location. Furthermore, once a consumer finds an ATM, there is a risk that ATM lines are long or that the ATM is not functioning. Additionally, ATMs pose security risks due to so called ATM skimming, where thieves use hidden electronics to steal personal information stored on a credit or debit card at an ATM. Other security risks include an increased likelihood of individuals viewing your personal information while you use an ATM, as well as ordinary strong arm robbery, since individuals visiting ATM's tend to have just withdrawn cash.

Consumers also may misplace their credit or debit card, have their credit or debit card stolen, or be subjected to account fraud. In such instances, a consumer's banking institution may send the consumer a replacement credit or debit card through the postal service, or the consumer may travel to a local banking location to receive a replacement card. But these actions are time consuming, and prevent the consumer from easily accessing money, at least until the consumer has been able to obtain their new card. Furthermore, delivery of replacement credit and debit cards poses an increased cost and security risk because human delivery may be required.

Consumers may also require fast delivery of important documents and financial instruments. For example, a consumer may need to sign a contract before a deadline, or need a cashier's check to make a payment. But movement and delivery of contracts and other important documents may be time consuming and expensive because human delivery may be required, and may also have security risks.

In view of the shortcomings of current systems and methods for providing access to financial goods, an on-demand, quick, secure, and convenient mechanism for delivering goods to consumers is desired.

SUMMARY

Disclosed embodiments provide systems and methods for coordinating a UV to perform authenticated delivery of goods.

Consistent with embodiments, systems for coordinating a delivery of a package of goods by a UV server are provided. A UV server system for coordinating a delivery may include one or more communication interfaces configured to communicate with a UV and a user device. The UV may include a Global Navigation Satellite System (GNSS) receiver. The user device may also include a GNSS receiver. The system may also include one or more memory devices storing processor instructions and one or more processors configured to execute the instructions to perform operations. The memory devices may also store user preferences on delivery logistics. The memory devices may also store user financial data.

The operations may include receiving real-time information comprising location information of the UV and the user device. The operations may also include authorizing the delivery of the package if an authentication process is satisfied based on the user preferences, the user financial data, and the real-time information. The operations may also include transmitting to the UV a command to complete the delivery, if the delivery is authorized. The operations may also include transmitting to the UV an abort command.

Consistent with the embodiments, methods for coordinating a delivery of a package of goods by a UV server are provided. A method may include instructing, via a communication network, a user device to collect user preferences on delivery logistics. The method may also include receiving the user preferences from the user device. The method may also include receiving user financial data from a financial service provider server. The method may also include receiving real-time information comprising location information of a UV and a user device. The method may also include authorizing the delivery of the package if an authentication process is satisfied based on the user preferences, the user financial data, and the real-time information. The method may also include transmitting to the UV a command to complete the delivery, if the delivery is authorized. The method may also include transmitting to the UV an abort command, if the delivery is not authorized.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

As described in further detail herein, the disclosed embodiments are directed to systems and methods for coordinating a UV to perform authenticated delivery of goods. In some embodiments, the delivered goods may be financial goods, such as one of more of cash, credit or debit cards, checks, cashier's checks, money orders, bullion, contracts, liens, credit reports, financial statements, important documents, and sensitive documents. The delivered goods may, in other embodiments, be any other item capable of being delivered. For example, a bank may send a home loan closing document to a consumer using UV. In another example, a bank may send a new credit or debit card associated with a new bank account.

In particular, systems and methods provide a UV server configured to perform an authentication process to determine whether to complete or to abort the delivery. In some embodiments, the authentication process may include multiple layers of verification of user identification information. In some embodiments, the authentication process may include a fraud detection engine based on user financial data. In some embodiments, a user may configure in advance methods and levels of the authentication process by creating a user profile with user preferences on delivery logistics. In some embodiments, the user may override the determination from the authentication process by directly controlling the UV delivery using the user's mobile device.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
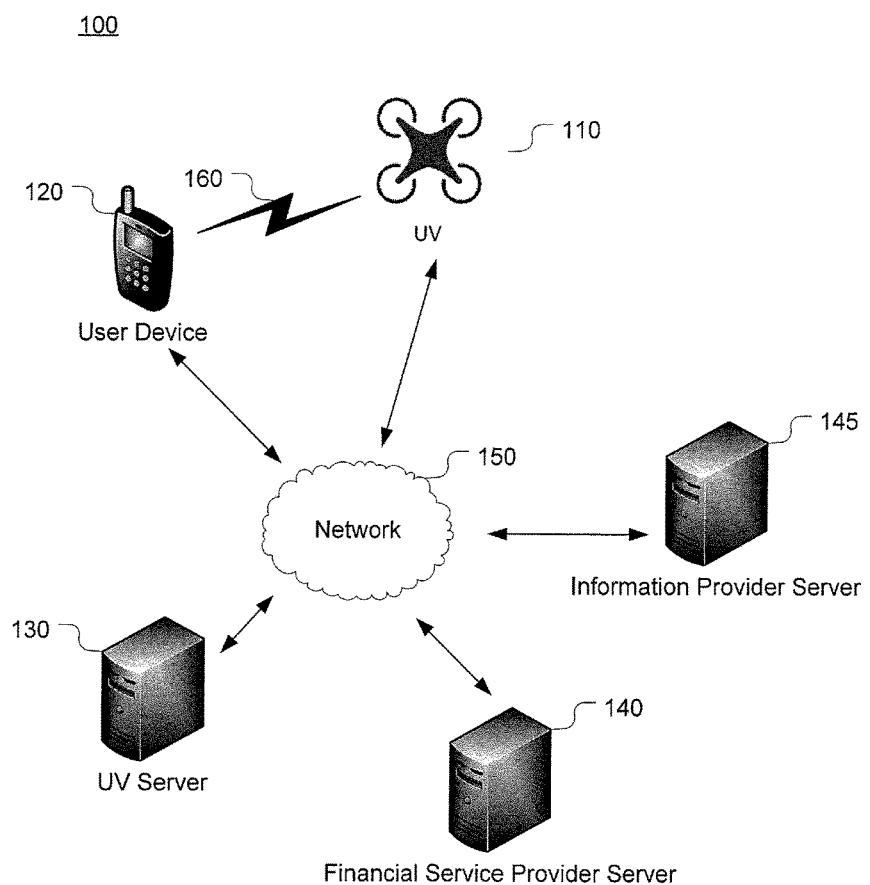
FIG. 1 is a diagram of an exemplary system that may be used to implement delivery of goods via a UV, consistent with disclosed embodiments.

FIG. 1 is a diagram of an exemplary system 100 that may be used to implement delivery of a package of goods via a UV, consistent with disclosed embodiments. In some embodiments, the delivered goods may be financial goods, such as, but not limited to, one of more of cash, credit or debit cards, checks, cashier's checks, money orders, bullion, contracts, liens, credit reports, financial statements, important documents, and sensitive documents. As shown in FIG. 1, system 100 may include a UV 110, a user device 120, a UV server 130, a financial service provider server 140, an information provider server 145, a network 150 to facilitate communication among the components of system 100, and a wireless communication link 160 to facilitate a direct communication between UV 110 and user device 120. The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary. In some embodiments, one or more of user device 120, UV server 130, financial service provider server 140, or information provider server 145 may be implemented as described below with respect to FIG. 2.

Consistent with disclosed embodiments, UV 110 may comprise an unmanned ground vehicle or UGV (e.g. an autonomous car), an unmanned aerial vehicle or UAV (e.g. a drone or quadcopter), or unmanned surface vehicle or USV (e.g. an autonomous boat), or the like. In some embodiments, UV 110 may comprise an aircraft that has an area for human passengers, but is unmanned in the sense that control of the vehicle is autonomous and is not performed by a human.

User device 120 may be operated by a user to create a user profile or request UV delivery of a package of goods, consistent with disclosed embodiments. The user profile may include user preferences on delivery logistics. User device 120 may be implemented using a variety of different equipment, such as, but not limited to, personal computers, vehicle computers, servers, mainframes, mobile devices, personal digital assistants (PDAs), smartphones, cell phones, smart-watches, smart-spectacles, tablets, thin clients, and the like. User device 120 may include one or more processor(s) and memory device(s) known to those skilled in the art. For example, user device 120 may include memory device(s) that store data and software instructions that, when executed by one or more processor(s), perform operations consistent with the disclosed embodiments. In some embodiments, user device 120 may have an application installed thereon, which may enable users to input their preferences on delivery logistics. User device 120 may be connected to a network such as network 150. In some embodiments, user device 120 may have an application installed thereon, which may enable user device 120 to communicate with UV 110 or UV server 130.

In some embodiments, user device 120 may also be operated by a user to directly control UV 110 either through network 150 or a wireless communication link 160. In some embodiments, user device 120 may include sensors configured to determine location, such as Global Navigation Satellite System (GNSS) receivers, including GPS, GLONASS, Galileo, BeiDou, and other regional satellite systems. UV 110 may be programmed with travel routes, coordinates, and the like.

UV server 130 may be one or more computing systems that are configured to execute software instructions stored on one or more memory devices to perform one or more operations consistent with the disclosed embodiments. For example, UV server 130 may include one or more memory device(s) storing data and software instructions, and one or more processor(s) configured to use the data and execute the software instructions to perform server-based functions and operations known to those skilled in the art. UV server 130 may be standalone, or it may be part of a subsystem, which may be part of a larger system. For example, UV server 130 may represent distributed servers that are remotely located and communicate over a public network (e.g., network 150) or a dedicated network, such as a LAN. An exemplary computing system consistent with UV server 130 is discussed in additional detail with respect to FIG. 2, below.

In some embodiments, UV server 130 may be configured as a particular apparatus, system, and the like based on the storage, execution, and/or implementation of software instructions that cause a processor to perform one or more operations consistent with the disclosed embodiments. UV server 130 may also monitor, track, and otherwise control UV 110. UV server may be configured to perform an authentication process to determine whether to complete or abort the final step of UV delivery. In some embodiments, UV server 130 may track, monitor, and control one or more unmanned vehicles. UV server 130 may be in communication with UV 110, one or more financial service provider servers 140, and user device 120 through network 150 or another network.

In some embodiments, UV server 130 may collect user preferences on delivery logistics from user device 120. In some embodiments, UV server 130 may receive the user preferences from financial service provider server 140. UV server 130 may also receive user's financial data, such as credit history and financial transaction history from financial service provider server 140. UV server 130 may also be in communication with one or more information provider servers 145. UV server 130 may be connected to a network, such as network 150.

Financial service provider server 140 may be a computer system associated with a financial service provider (not shown), such as a bank, a credit or debit card provider, a credit reporting agency, or an insurance company. Financial service provider server 140 may also include a computer system associated with a distribution center which may have an inventory of financial products, such as financial cards/replacement cards, checks/replacement checks, documents, or an inventory of goods; a check printing facility; a document printing facility; a document repository; etc.

Information provider server 145 may include a computer system associated with an information provider service, including but not limited to, weather information providers, traffic information providers, map services, social networking services, crime reporting services, news providers, air traffic control systems, police services, medical emergency services, and fire services.

Network 150, in some embodiments, may comprise one or more interconnected wired or wireless data networks that receive data from one device (e.g., UV server 130) and send it to another device (e.g., UV 110). For example, network 150 may be implemented as the Internet, a wired Wide Area Network (WAN), a wired Local Area Network (LAN), a wireless LAN (e.g., Institute of Electrical and Electronics Engineers (IEEE) 802.11, Bluetooth, etc.), a wireless WAN (e.g., Worldwide Interoperability for Microwave Access (WiMAX)), a public switched telephone network (PSTN), an Integrated Services Digital Network (ISDN), an infrared (IR) link, a radio link, such as a Universal Mobile Telecommunications System (UMTS), Global System for Mobile Communications (GSM), Code Division Multiple Access (CDMA), broadcast radio network, cable television network, a satellite link, and the like.

Each component in system 100 may communicate bi-directionally with other system 100 components either through network 150 or through one or more direct communication links, such as wireless communication link 160 between UV 110 and user device 120. For ease of discussion, FIG. 1 depicts only particular components being connected to network 140. In some embodiments, however, more or fewer components may be connected to network 150.

In some embodiments, wireless communication link 160 may include a direct communication network, including, for example, Bluetooth, Wi-Fi, or other suitable communication methods that provide a medium for transmitting data between separate devices.

Figure 2:
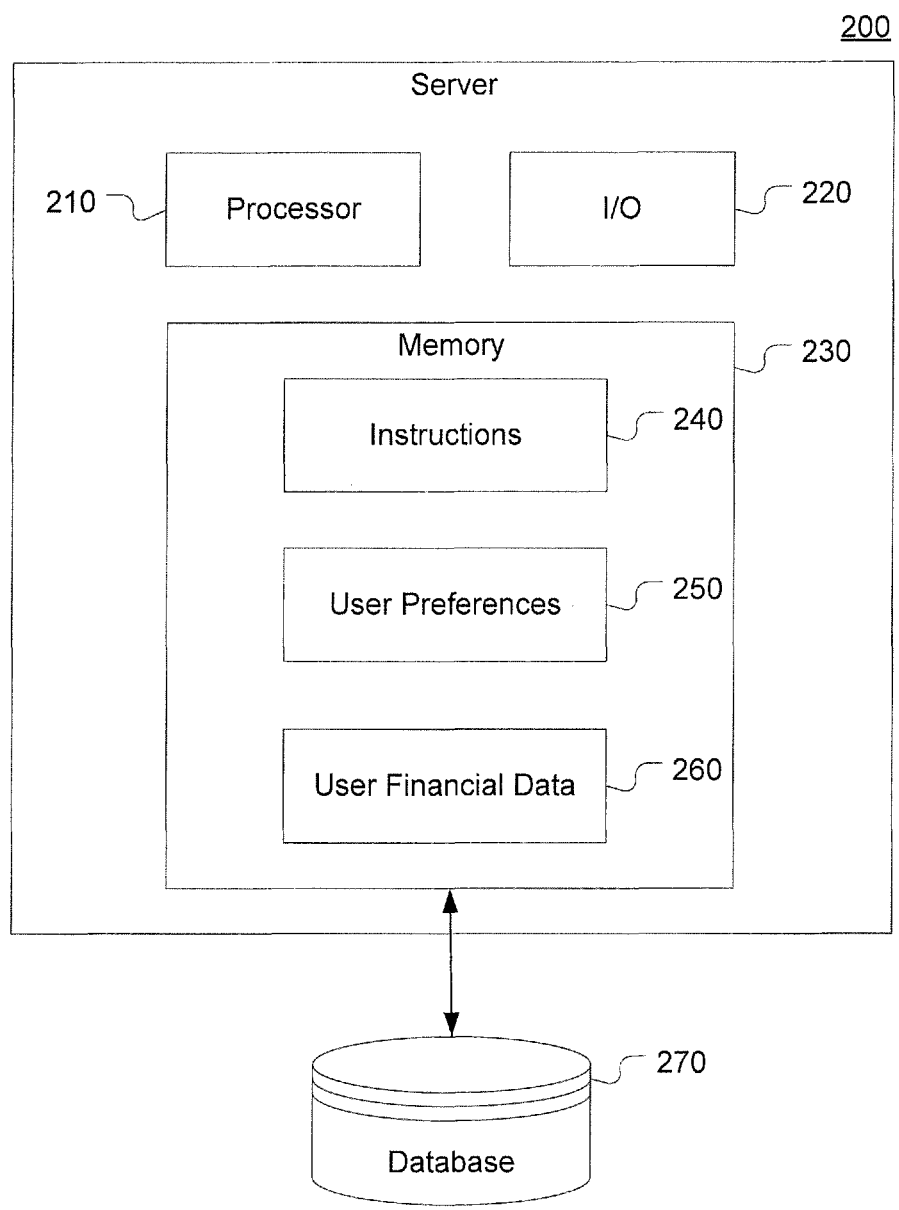
FIG. 2 is a diagram of an exemplary UV server system, consistent with disclosed embodiments.

FIG. 2 is a diagram of an exemplary computing system 200 illustrating a computing system configuration that may, in some embodiments, implement UV server 130 described above with respect to system 100 (FIG. 1). In some embodiments, computing system 200 may include one or more processors 210, one or more I/O devices 220, and one or more memory devices 230. In some embodiments, computing system 200 may take the form of a server, general purpose computer, a mainframe computer, laptop, smartphone, or any combination of these components. In some embodiments, computing system 200 or a system including computing system 200 may be configured as a particular apparatus, system, and the like based on the storage, execution, and/or implementation of the software instructions that cause a processor to perform one or more operations consistent with the disclosed embodiments. Computing system 200 may be standalone, or it may be part of a subsystem, which may be part of a larger system. Computing system 200 may include an internal database 270 or be in communication with an external database (not shown).

Processor 210 may constitute a single-core or multiple-core processor that may execute parallel processes simultaneously. In some embodiments, processor 210 may be a single core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, in some embodiments, I/O devices 220 may comprise network adapters providing communication with network 150, such as the Internet, a private data network, a virtual private network using a public network, a Wi-Fi network, a LAN or WAN network, a cellular network, or other suitable communication networks. In some embodiments, I/O devices 220 may comprise wireless communication device providing a direct communication link 160, such as Bluetooth, Wi-Fi, near field communications (NFC), or other suitable communication methods that provide a medium for transmitting data between separate devices.

In some embodiments, I/O device 220 may be configured to receive user preferences 250 from user device 110. I/O device 220 may also be configured to receive user financial data 260 from financial service provider server 140. I/O device 220 may also be configured to receive real-time information from UV 110, user device 120, or information provider server 145. In some embodiments, real-time information may include location information of UV 110, location information of user device 120, weather information, traffic information, map data, social networking data, crime reports, news, air traffic control data, police data, medical emergency data, and fire service data. In some embodiment, real-time information may also include data captured by a sensor on UV 110, such as images, video, biometric authentication data (for example, finger print scan data and facial scan data), temperature data, speed data, and wind speed data.

In some embodiments, computing system 200 may include interface components, which may provide interfaces to one or more input devices, such as one or more keyboards, mouse devices, and the like, which may enable computing system 200 to receive input from an operator of UV server 130 (not shown).

Memory 230 may include one or more storage devices configured to store instructions used by processor 210 to perform functions related to the disclosed embodiments. For example, memory 230 may be configured with one or more software instructions, such as instructions 240 that may perform one or more operations when executed by processor 210. The disclosed embodiments are not limited to separate programs or computers configured to perform dedicated tasks. Additionally, processor 210 may execute one or more instructions located remotely from computing system 200. Processor 210 may further execute one or more instructions located in database 270. In some embodiments, instructions 240 may be stored in an external storage device, such as a cloud server located outside of computing system 200, and processor 210 may execute instructions 240 remotely.

Memory 230 may also store data that may reflect any type of information in any format that the system may use to perform operations consistent with the disclosed embodiments. Memory 230 may store instructions 240 to enable processor 210 to execute one or more applications, such as server applications, an authentication application, network communication processes, and any other type of application or software. Alternatively, the instructions 240 may be stored in an external storage (not shown) in communication with computing system 200 via network 150 or any other suitable network. Memory 230 may be a volatile or non-volatile, magnetic, semiconductor, tape, optical, removable, non-removable, or other type of storage device or tangible (i.e., non-transitory) computer-readable medium.

In some embodiments, instructions 240 executed by processor 210 may cause processor 210 to perform one or more processes related to UV delivery including, but not limited to, receiving location information of UV 110 and/or user device 120, authorizing the delivery of a package of goods, instructing completion of delivery, or instructing abort of delivery based on user preferences 250, user financial data 260, and/or real-time information.

Memory 230 may also include user preferences 250 entered by the user. User preferences 250 may include information related to logistics of UV delivery, such as traveling routes (e.g., by flying or driving), destinations, package release methods, authentication processes, and delivery confirmation processes. For example, user may choose different delivery logistics based on multiple factors, such as time of delivery, weather, type of goods in the package, value of the goods, weight of the package, user's location, or other relevant factors.

In some embodiments, user preferences 250 may include a default delivery destination. A user may set different default delivery destination depending on the type of goods. User preferences 250 may also include a backup delivery destination where the package would be redirected when the delivery to the default delivery destination is aborted, failed, or interrupted. Alternatively, a user may choose location-tracking delivery, where the delivery destination is tied to the user's tracked location based on the location of user device 120. For example, if a user is traveling, UV 110 or UV server 130 may track the user's location through communication with the user's user device 120, follow the user until the user's travel path meets the travel path of UV 110, and then deliver the package to the user. In another example, if a user is traveling in a vehicle and requests location-tracking delivery, UV 110 may land and dock on the vehicle in which the user is traveling, and authentication may be implemented via an on-board computer of the consumer's vehicle.

In some embodiments, user preferences 250 may also include user's preference on delivery logistics based on types of goods. In some embodiments, a user may allow UV to apply different ways to deliver a package to a user, depending on types of financial goods. For example, user may allow a package carrying monthly credit card statements to be dropped off from the air while UV 110, for example a drone, is hovering over the destination. For another example, a user may require a package carrying cash or a credit card to be released only after UV 110 has landed on the ground close to the destination.

In some embodiments, a user may choose different authentication processes based on the type of the goods in the package. For example, for advertising materials, the user may opt in for a simple location-based authentication. In such case, the UV completes the package delivery as soon as it arrives at the destination. As another example, for highly sensitive and/or financial goods, like cash, bills or credit reports, the user or the financial service provider may require UV server 130 to perform a multiple layer authentication process, such as biometric data authentication, in-person authentication, personal identification number, mobile device identification, and credit or debit card swipe, etc.

Memory 230 may also include user financial data 260. User financial data 260 may include a user's financial account information, username and password, credit or debit card PIN, biometric information, credit scores, financial transaction history, retail transaction history, home or work locations, user location data for past financial or retail transactions, and financial data breach alerts. In some embodiments, computing system 200 may receive user financial data 260 from financial service provider server 140 via network 150, and store the received user financial data 260 to memory 260. In some embodiments, computing system 200 may create per-user profile including user preferences 250 and user financial data 260, and store the user profile in memory 230, an internal database 270, or an external database (not shown).

Processor 210 may execute instructions 240 to analyze user preferences 250 and user financial data 260 to perform UV delivery operations, consistent with disclosed embodiments. For example, processor 210 may authorize UV delivery based on user preferences 250 and user financial data 260.

Figure 3:
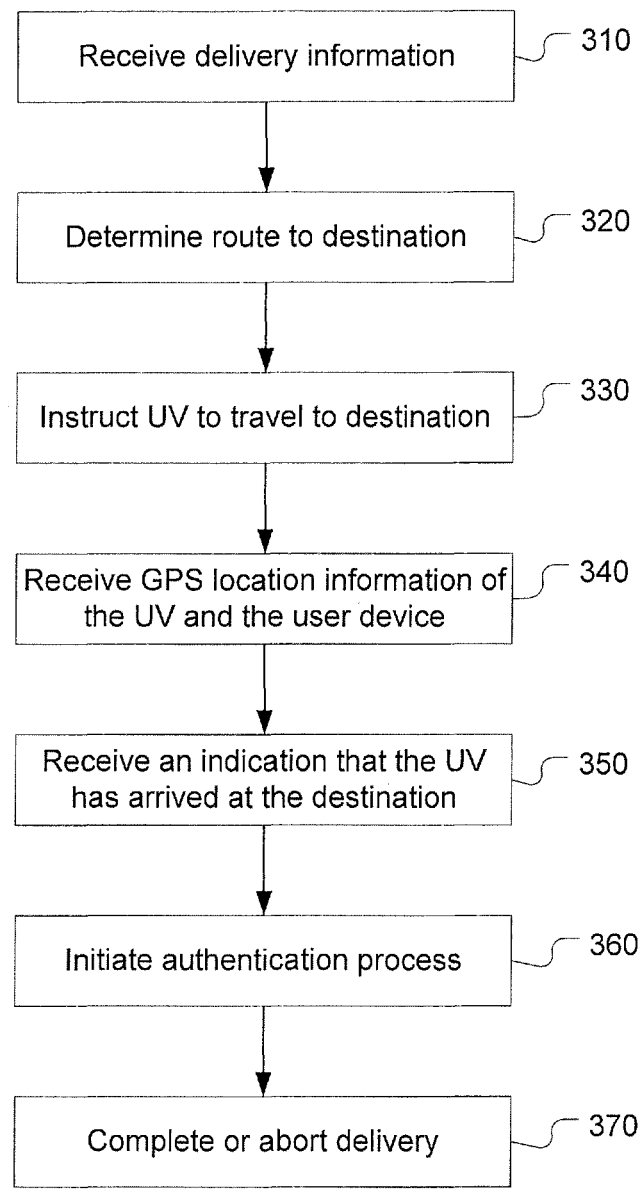
FIG. 3 is a flowchart of an exemplary process for delivery via a UV, consistent with disclosed embodiments.

FIG. 3 is a flowchart of an exemplary process for delivery via a UV, consistent with disclosed embodiments. Process 300 may be performed by processor 210 of, for example, UV server 130 executing instructions encoded on a computer-readable medium storage device. It is to be understood, however, that one or more steps of process 300 may be implemented by other components of system 100 (shown or not shown), including UV 110 or user device 120.

At step 310, UV server 130 may receive delivery information. In some embodiments, UV server 130 may receive delivery information from user device 120. For example, user device 120 may execute a mobile application associated with a financial service provider. The user may request a cash delivery via UV 110 through a mobile application associated the financial service provider. Financial service provider server 140 associated with the financial service provider may then send delivery information to UV server 130 to initiate cash delivery to the user. In another embodiment, UV server 130 may receive delivery information from financial service provider server 140. For example, a financial service provider may initiate delivery of a package of financial goods even without a user's request. In such case, financial service provider server 140 may request UV server 130 to deliver a replacement credit or debit card, for example, when expiration date approaches closely.

Upon receiving delivery information, UV server 130 may determine a route to destination (step 320), and instructs UV 110 to travel to the destination (step 330). During travel to the destination, UV server 130 may be in communication with UV 110 and track location of UV 110. For example, UV server 130 may send periodic status inquiry signals to UV 110. UV 110 may respond to status inquiry signals by a response signal indicating location, speed, temperature, tampering event detection, and/or any other information relevant to the delivery.

At step 340, UV server 130 may also receive location information of user device 120. During travel to the destination, UV server 130 may also be in communication with user device 120 and track location of user device 120. For example, UV server 130 may determine that UV 110 has arrived at the destination based on the received location information of UV 110 and user device 120. In some embodiments, as in step 350, UV server 130 may receive an indication that UV 110 has arrived at the destination. The indication may be sent by UV 110 or user device 120. For example, user device 120 may receive status information of UV 110, over network 150 or wireless communication link 160, comprising location, speed, and estimated delivery time. User device 120 may detect that UV 110 has arrived within a predetermined distance of user device 120, and the send an indication to UV server 130.

At step 360, an authentication process may be initiated. In some embodiments, once UV 110 has reached the destination, UV 110 may wait for user interaction to initiate an authentication process. Alternatively, in some embodiments, UV 110 or UV server 130 may automatically initiate an authentication process when UV 110 has reached the destination. In some embodiments, UV server may authorize the package delivery if the authentication process is successfully completed. The authentication process may require a user, via user device 120, to enter one or more of personal identification numbers, swipe a credit or debit card, have a picture taken, have a retina scanned, have a finger print scanned, speak into a microphone, or take another action for verification. The authentication process may also be based on information collected by UV 110, such as camera image, video capture, location information, distance to user device, or the like.

In some embodiments, the authentication process may also rely on user preferences 250. For example, a user may choose different authentication processes based on the type of the goods. For example, for advertising materials, user preferences may be configured by the user to allow package delivery with a simple location-based authentication. In such case, the UV completes the package delivery as soon as it arrives at the destination. In another example, for highly sensitive financial goods, like cash bills or credit reports, user may opt in for a multi-tiered authentication process, such as additionally requiring, biometric data authentication, in-person authentication, personal identification number, mobile device identification, and credit or debit card swipe, etc.

In some embodiments, the authentication process may also rely on user financial data 260. For example, the authentication process may include a determination based on a user's financial account information, username and password, credit or debit card PIN, biometric information, credit scores, financial transaction history, retail transaction history, home or work locations, user location data for past financial or retail transactions, and financial data breach alerts. For example, the authentication may be rejected if user's credit score is lower than a predefined threshold.

In some embodiments, the authentication process may also include a fraud detection engine, which detect a potential fraud activity based on the received user financial data, such as a user's financial account information, username and password, credit or debit card PIN, biometric information, credit scores, financial transaction history, retail transaction history, home or work locations, user location data for past financial or retail transactions, and financial data breach alerts. The authentication may be declined when a potential fraud activity is detected via the fraud detection engine. For example, the authentication may be rejected when suspicious activity is detected in user's financial transaction history. The authentication may also be rejected when a suspicious activity is detected from geographical pattern of user's financial or retail transaction history.

At 370, depending of the determination of the authentication process in step 360, UV 110 may complete or abort the package delivery. For example, if authorized, UV server 130 may instruct UV 110, for example a drone, to complete the delivery by releasing the package from the air while hovering over the destination. In embodiments where UV 110 is not an aerial vehicle and is, for example, a ground-based vehicle or UGV, UV server 130 may instruct UV 110 to release the package onto the ground or open a compartment to enable a person to retrieve the package. In some embodiments, UV server 130 may complete the delivery after a drone lands on the ground at the destination. When a drone lands, it may release the package at the landing location right away, or it may wait for a user to provide an additional authentication data through UV 110 or user device 120. In some embodiments, a user may configure a default delivery method by setting up user preferences. In some embodiments, if not authorized, UV server 130 may instruct UV 110 to abort the delivery at the destination. When the delivery is aborted, in some embodiments, UV 110 may be automatically directed to a backup destination indicated in user preferences 250, when delivery to the default destination is not authorized, failed, or interrupted. Alternatively, in some embodiments, UV 110 may return to its base (e.g., the location where it departed with the package) with the package.

In some embodiments, the user may override the determination from the authentication process by directly controlling the UV using user device 120. In some embodiments, a user device 120 may be configured to allow receipt of a user command to directly control the UV delivery. The user command may be communicated to UV 110 through network 150 or wireless communication link 160. The user command may also be communicated to UV server 130 through network 150. In some embodiments, upon receipt of user's direct control command, UV 110 or UV server 130 may disregard the determination from the authentication process and follow the user commands. For example, a user may enter an abort command (e.g., through an application running on user device 120) to postpone or cancel the UV delivery, even though the delivery has been authorized through the authentication process.

Figure 4:
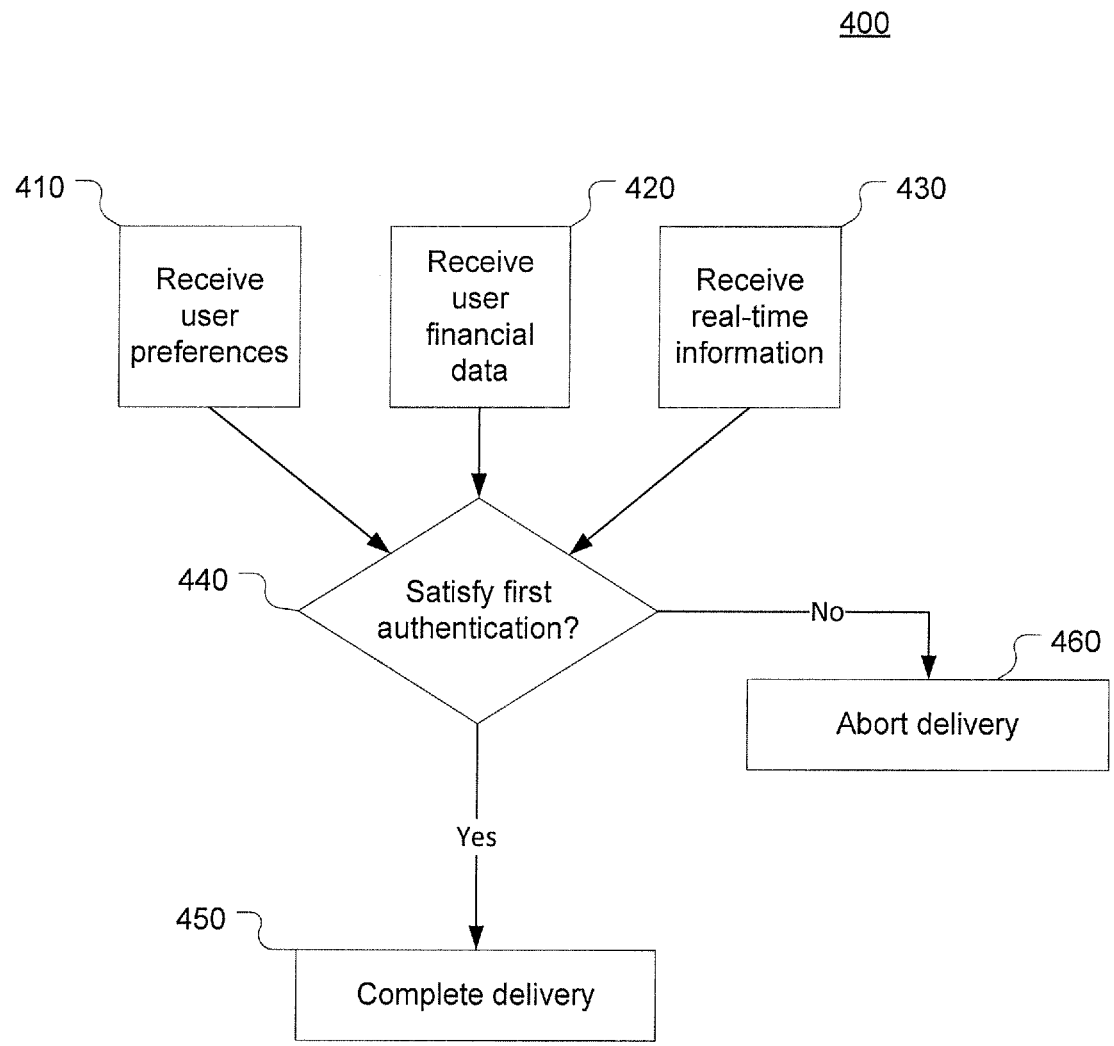
FIG. 4 is a flowchart of exemplary authentication process, consistent with disclosed embodiments.

FIG. 4 is a flowchart of an exemplary authorization process, consistent with disclosed embodiments. Process 400 may be performed by processor 210 of, for example, UV server 130 executing instructions encoded on a computer-readable medium storage device. It is to be understood, however, that one or more steps of process 400 may be implemented by other components of system 100 (shown or not shown), including UV 110 or user device 120.

At step 410, UV server 130 may receive user preferences. As described above, in some embodiments, user preferences 250 may have been collected from user device 120 and stored in memory 230. UV server 130 may retrieve the stored user preferences 250 from memory 230. In some embodiments, UV server 130 may receive user preferences 250 from financial service provider server 140. User preferences 250 may include information related to logistics of UV delivery, such as traveling routes, destinations, package release methods, authentication processes, and delivery confirmation processes. For example, user may choose different delivery logistics based on multiple factors, such as time of delivery, weather, type of goods, user's location, or other relevant factors.

At step 420, UV server 130 may also receive user financial data. As described above, in some embodiments, user financial data 260 may have been collected from financial service provider server 140 and stored in memory 230. UV server 130 may retrieve the stored user financial data 250 from memory 230. In some embodiments, UV server 130 may receive an update on user financial data 260 from financial service provider server 140. User financial data 260 may include a user's financial account information, username and password, credit or debit card PIN, biometric information, credit scores, financial transaction history, retail transaction history, home or work locations, user location data for past financial or retail transactions, and financial data breach alerts.

At step 430, UV server 130 may also receive real-time information. UV server 130 may comprise an I/O device 220, which is configured to receive real-time information from UV 110, user device 120, or information provider servers 145. In some embodiments, real-time information may include location information of UV 110 and location information of user device 120. In some embodiments, real-time information may also include data captured by a sensor on UV 110, such as images, video, biometric authentication data (for example, fingerprint scan data or facial scan data), temperature data, speed data, and wind speed data. In some embodiments, real-time information may also include data provided by information provider servers 145, such as weather information, traffic information, map data, social networking data, crime reports, news, air traffic control data, police data, medical emergency data, and fire service data.

At step 440, UV server 130 may determine whether an authentication criterion is satisfied based on user preferences 250, user financial data 260, and real-time information. In some embodiments, a user may configure requirements of the authentication criterion through user preferences 250. In some embodiments, a financial service provider may configure the requirements based on the type(s) of goods to be delivered.

At step 450, UV server 130 may instruct UV 110 to complete delivery of the package. In some embodiments, the delivery may be completed by different methods based on user preferences 250. For example, the delivery may be completed by dropping the package from UV 110 in the air while hovering over the destination. Alternatively, the delivery may be completed after landing UV 110 on the ground at the destination. In some embodiments, UV 110 may obtain information confirming the delivery. For example, UV 110 may capture an image or a video showing that the package is successfully delivered to the location according to user preferences 250. In some embodiments, UV 110 may obtain a signature of a user as evidence of successful delivery.

At step 460, UV server 130 may instruct UV 110 to abort the delivery at the destination. Additionally, in some embodiments, UV 110 may be automatically directed to a backup destination based on user preferences 250 when delivery to the default destination is not authorized, failed, or interrupted.

Figure 5:
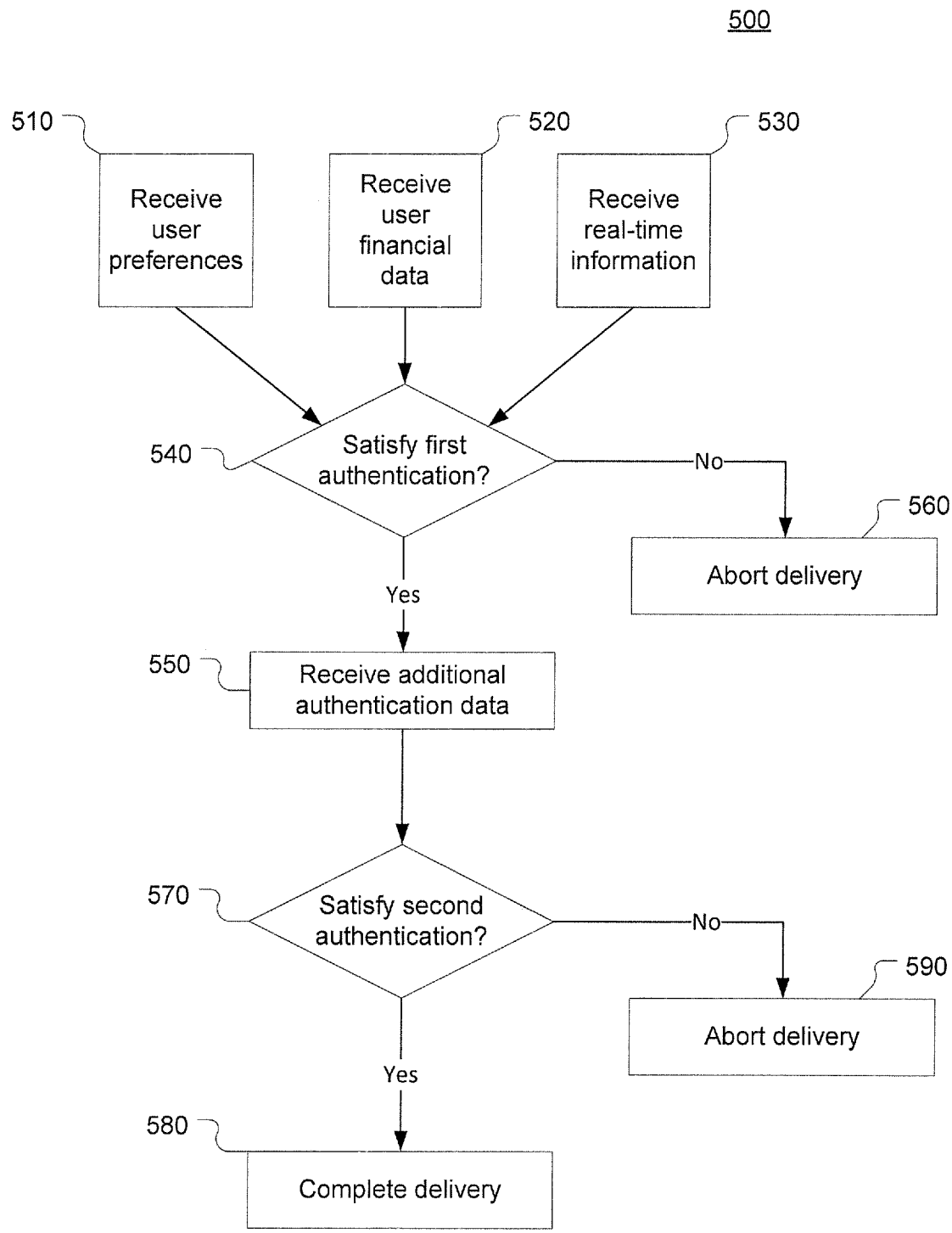
FIG. 5 is a flowchart of an exemplary multi-tiered authentication process, consistent with disclosed embodiments.

FIG. 5 is a flowchart of an exemplary multi-tiered authentication process, consistent with disclosed embodiments. Process 500 may be performed by processor 210 of, for example, UV server 130 executing instructions encoded on a computer-readable medium storage device. It is to be understood, however, that one or more steps of process 500 may be implemented by other components of system 100 (shown or not shown), including UV 110 or user device 120.

At step 510, UV server 130 may receive user preferences. In some embodiments, user preferences 250 may have been collected from user device 120 and stored in memory 230. UV server 130 may retrieve the stored user preferences 250 from memory 230. In some embodiments, UV server 130 may receive user preferences 250 from financial service provider server 140. User preferences 250 may include information related to logistics of UV delivery, such as flying routes, destinations, package release methods, authentication processes, and delivery confirmation processes. For example, user may choose different delivery logistics based on multiple factors, such as time of delivery, weather, type of goods, user's location, or other relevant factors.

At step 520, UV server 130 may also receive user financial data. In some embodiments, user financial data 260 may have been collected from financial service provider server 140 and stored in memory 230. UV server 130 may retrieve the stored user financial data 250 from memory 230. In some embodiments, UV server 130 may receive an update on user financial data 260 from financial service provider server 140. User financial data 260 may include a user's financial account information, username and password, credit or debit card PIN, biometric information, credit scores, financial transaction history, retail transaction history, home or work locations, user location data for past financial or retail transactions, and financial data breach alerts.

At step 530, UV server 130 may also receive real-time information. UV server 130 may comprise an I/O device 220, which is configured to receive real-time information from UV 110, user device 120, or information provider servers 145. In some embodiments, real-time information may include location information of UV 110 and location information of user device 120. In some embodiments, real-time information may also include data captured by a sensor on UV 110, such as images, video, biometric authentication data (for example, fingerprint scan data or facial scan data), temperature data, speed data, and wind speed data. In some embodiments, real-time information may also include data provided by information provider servers 145, such as weather information, traffic information, map data, social networking data, crime reports, news, air traffic control data, police data, medical emergency data, and fire service data.

At step 540, UV server 130 may perform a first tier authentication process based on user preferences, user financial data, and real-time information. UV server 130 may determine whether the first authentication criterion is satisfied based on user preferences 250, user financial data 260, and real-time information. In some embodiments, a user may configure requirements of the authentication criterion through user preferences 250. In some embodiments, a financial service provider may configure the requirements based on the type(s) of goods to be delivered. If the first authentication fails, the UV delivery may be aborted at step 560.

At step 550, UV server 130 may receive an additional authentication data to perform a second authentication process. The additional authentication data may include a username and password, a GNSS location, a phone number, or a user device identification number. The additional authentication data may also include biometric data, such as fingerprint scan data, retina or iris scan, heartbeat or pulse pattern, facial recognition, voice recognition, palm vein scan data, or the like, which may be compared with a user profile data stored in UV server 130 or financial service provider server 140.

At step 570, UV server 130 may determine whether the second authentication criterion is satisfied based on the received additional authentication data. In some embodiments, UV server 130 may also consider user preferences 250, user financial data 260, and real-time information for the second tier authentication determination. In some embodiments, a user may configure requirements of the second authentication criterion through user preferences 250. In some embodiments, a financial service provider may configure the requirements for the second tier authentication based on types of financial goods to delivery.

At step 580, UV server 130 may instruct UV 110 to complete delivery of the package. In some embodiments, the delivery may be completed by different methods based on user preferences 250. For example, the delivery may be completed by dropping the package from UV 110 in the air while hovering over the destination. Alternatively, the delivery may be completed after landing UV 110 on the ground at the destination. In some embodiments, UV 110 may obtain information confirming the delivery. For example, UV 110 may capture an image or a video showing that the package is successfully delivered to the location according to user preferences 250. In some embodiments, UV 110 may obtain a signature of a user as evidence of successful delivery.

When either of the first or the second authentication fails (at steps 540 or 570) UV server 130 may, in steps 560 or 590 (respectively) instruct UV 110 to abort the delivery at the destination. Additionally, in some embodiments, UV 110 may be automatically directed to a backup destination (for example, based on user preferences 250) when delivery to the default destination is unauthorized, has failed, or was interrupted.

Figure 6:
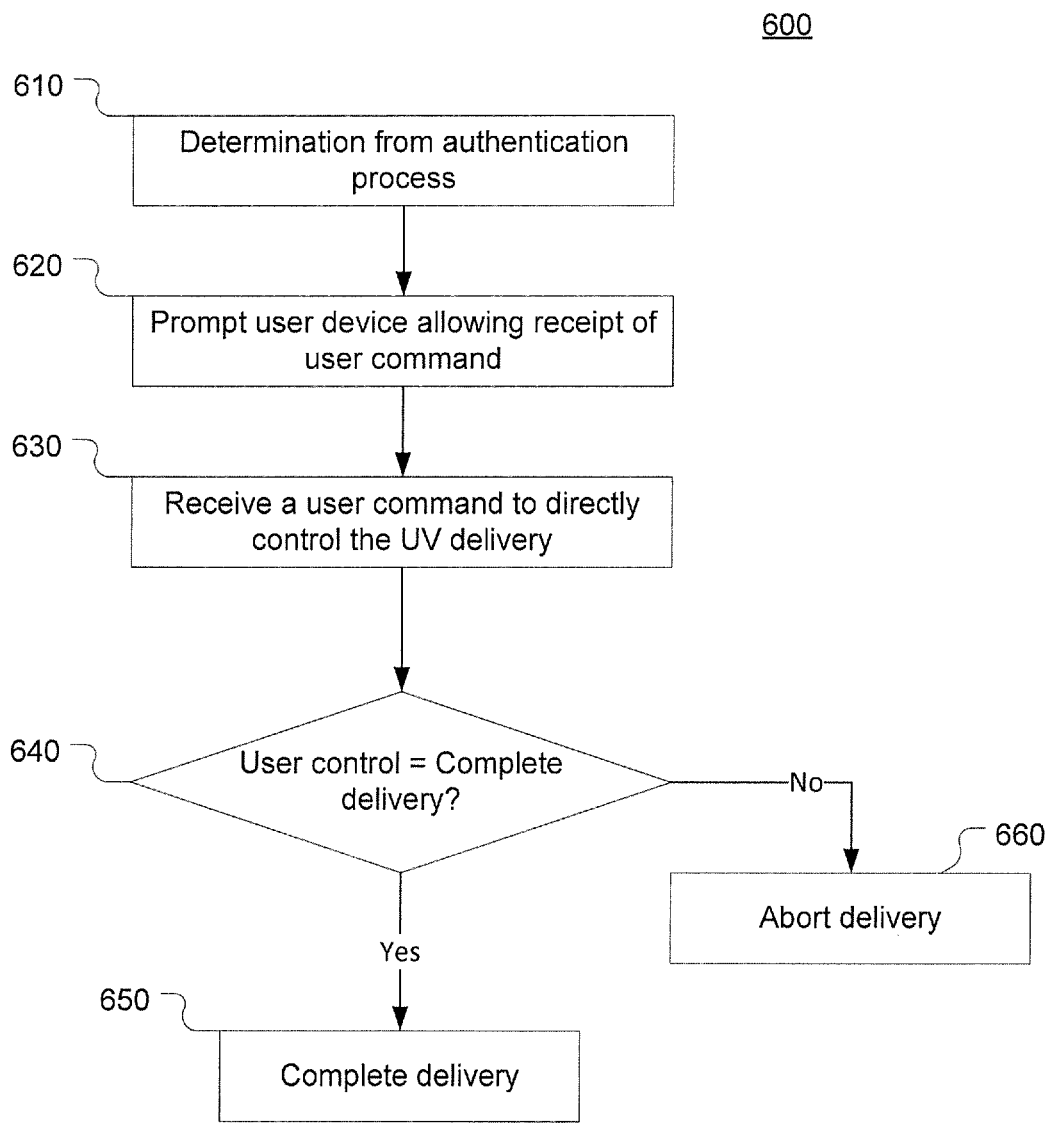
FIG. 6 is a flowchart of an exemplary process for direct control of UV delivery by a user, consistent with disclosed embodiments.

FIG. 6 is a flowchart of an exemplary process for direct control of UV delivery by a user, consistent with disclosed embodiments. Process 600 may be performed by processor 210 of, for example, UV server 130 executing instructions encoded on a computer-readable medium storage device. It is to be understood, however, that one or more steps of process 600 may be implemented by other components of system 100 (shown or not shown), including UV 110 or user device 120.

At step 610, as also discussed with reference to FIG. 4 and FIG. 5, UV server 130 may perform an authentication process to determine whether to complete or abort the delivery. In some embodiments, step 610 may begin after steps 450 or 580 in FIGS. 4 and 5, respectively.

At step 620, UV server 130 may instruct user device 120 to prompt the user to provide a user command to directly control the UV delivery. In some embodiments, UV server 130 may receive a user command from user device 120 via network 150 (step 630). For example, the application on user device 120 may display GUI buttons, such as "COMPLETE DELIVERY," "LAND," or "ABORT" to provide options for the user to directly control the UV delivery. In some embodiments, user device 120 may also provide an option to change the time of delivery. For example, the application on user device 120 may display GUI buttons, such as "10 MIN," "30 MIN," or "1 HOUR." By pressing "30 MIN" button, for example, the user may postpone the delivery for 30 minutes.

At step 640, UV server 130 may coordinate UV delivery purely based on the user commands regardless of the determination from the authentication process. For example, upon receiving "COMPLETE DELIVERY" command from user device 120, UV server 130 may instruct UV 110 to complete the delivery. In such case, the delivery will be completed even if the authentication process has failed. In another example, upon receiving "30 MIN" postpone command, UV server 130 may instruct UV 110 to wait for 30 minutes by hovering in the air around the destination, even if the authentication process has authorized UV to land at destination to deliver the package.

At 650, UV server 130 may instruct UV 110 to complete delivery of the package. In some embodiments, the delivery may be completed by different methods based on user preferences 250. For example, the delivery may be completed by dropping the package from UV 110, for example a drone, in the air while hovering over the destination. Alternatively, the delivery may be completed after landing UV 110 on the ground at the destination. In some embodiments, UV 110 may obtain information confirming the delivery. For example, UV 110 may capture an image or a video showing that the package is successfully delivered to the location according to user preferences 250. In some embodiments, UV 110 may obtain a signature of a user as evidence of successful delivery.

At 660, UV server 130 may instruct UV 110 to abort the delivery at the destination. Additionally, in some embodiments, UV 110 may be automatically directed to a backup destination (for example, based on user preferences 250) when delivery to the default destination is unauthorized, has failed, or was interrupted.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™ (see https://docs.oracle.com/javase/8/docs/technotes/guides/language/), C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A user device for coordinating a delivery of a package to a user using an Unmanned Vehicle (UV), the user device comprising:
    one or more memory devices storing instructions; and
    one or more processors configured to execute the instructions to perform operations comprising:
        receiving user preferences on delivery logistics;
        receiving first information from a UV server comprising a location of the UV;
        receiving second real-time information comprising a location of the user device;
        determining, based on the user preferences and the first real-time information and the second real-time information, whether the delivery of the package is authorized, the determination comprising:
        performing an authentication process according to two or more authentication criteria, the two or more authentication criteria configured by the user;
        wherein the authentication process comprises:
            determining whether the user preferences and the first real-time information and the second real-time information satisfy a first authentication criterion of the two or more authentication criteria;
            determining that a second authentication criterion of the two or more authentication criteria is required based on the two or more authentication criteria;
            receiving, at the user device, a request for additional authentication data;
            transmitting the additional authentication data from the user device in response to user input, wherein the additional authentication data comprises financial data; and
            determining whether the additional authentication data satisfies the second authentication criterion by processing the additional authentication data through a fraud detection engine;
        prompting the user to provide a user command to directly control the delivery;
        if the user instructs to complete the delivery, transmitting to the UV server a command to complete the delivery; and
        if the user instructs to abort the delivery, transmitting to the UV server an abort command.

2. The user device of claim 1 wherein the first real-time information comprises data captured by a sensor on the UV, the sensor comprising an image sensor, a video camera, a temperature sensor, an accelerometer, or a wind speed sensor.

3. The user device of claim 1, wherein the operations further comprise:
    receiving, from the UV server, information confirming the delivery.

4. The user device of claim 3, wherein the information confirming the delivery comprises an image or a video captured by the UV.

5. The user device of claim 1, wherein the operations further comprise:
    directing the UV to a backup destination based on the user preferences and the first real-time information if the user instructs to abort the delivery.

6. The user device of claim 1, wherein the operations further comprise:
    receiving, from the UV server, a notification that the UV has arrived within a predefined distance of a destination.

7. The user device of claim 1, wherein the user preferences include a default delivery destination based on a type of good associated with the package.

8. The user device of claim 1, wherein the user device is configured to enable the user to input the user preferences on delivery logistics.

9. The user device of claim 1, wherein the user device is configured to enable the user to communicate with the UV or the UV server.

10. The user device of claim 1, wherein the user preferences on delivery logistics comprise traveling routes, destinations, package release methods, authentication processes, or delivery confirmation processes.

11. The user device of claim 1, wherein the user preferences on delivery logistics include a location-tracking delivery in which a delivery destination is tied to the user device location.

12. The user device of claim 1, wherein the authentication process is a multiple layer authentication process.

13. The user device of claim 1, wherein the first real-time information includes information provided by an information provider server, comprising weather information, traffic information, map data, social networking data, crime reports, news, air traffic control data, police data, medical emergency data, or fire service data.

14. The user device of claim 1, wherein the user configures the two or more authentication criteria through the user preferences.

15. A method for coordinating a delivery of a package by an Unmanned Vehicle (UV) to a user through use of a user device, comprising:
    collecting user preferences on delivery logistics;
    receiving first real-time information comprising location information of a UV from a UV server;

collecting second real-time information comprising a location of the user device;

determining, based on the user preferences and the first real-time information and the second real-time information, whether the delivery of the package is authorized, the determination comprising;

performing an authentication process according to two or more authentication criteria;

wherein the authentication process comprises:

determining whether the user preferences and the first real-time information and the second real-time information satisfy a first authentication criterion of the two or more authentication criteria;

determining that a second authentication criterion of the two or more authentication criteria is required based on the two or more authentication criteria;

receiving, at the user device, a request for additional authentication data;

transmitting the additional authentication data from the user device in response to user input, wherein the additional authentication data comprises financial data; and determining whether the additional authentication data satisfies the second authentication criterion by processing the additional authentication data through a fraud detection engine;

prompting the user to provide a user command to directly control the delivery;

if the user instructs to complete the delivery, transmitting to the UV server a command to complete the delivery; and if the user instructs to abort the delivery, transmit to the UV server an abort command.

16. The method of claim 15, further comprising:

receiving, from the UV, information confirming the delivery; and transmitting, to the user, a communication message providing a delivery confirmation.

17. The method of claim 15, further comprising:

if the user instructs to abort the delivery, directing the UV to a backup destination based on the user preferences and the first real-time information.

18. The method of claim 15, wherein the user preferences include a default delivery destination based on a type of good associated with the package.

19. The method of claim 15, wherein the user preferences include a location-tracking delivery in which a delivery destination is tied to the user device location.

20. The method of claim 15, wherein the user preferences on delivery logistics comprises traveling routes, destinations, package release methods, authentication processes, or delivery confirmation processes.

* * * * *